(12) United States Patent
Walker et al.

(10) Patent No.: US 7,766,130 B2
(45) Date of Patent: Aug. 3, 2010

(54) WEAR PIN ASSEMBLIES FOR CARBON-CARBON COMPOSITE BRAKE SYSTEMS

(75) Inventors: Terence B. Walker, South Bend, IN (US); Akshay Waghray, Granger, IN (US); Laurie A. Booker, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 980 days.

(21) Appl. No.: 10/993,300

(22) Filed: Nov. 19, 2004

(65) Prior Publication Data

US 2006/0108182 A1     May 25, 2006

(51) Int. Cl.
*F16D 66/02* (2006.01)
*F16D 65/00* (2006.01)
(52) U.S. Cl. .............................. 188/1.11 W; 188/1.11 L
(58) Field of Classification Search ............ 188/1.11 R, 188/1.11 W, 1.11 L, 1.11 E, 79.51, 73.31; 200/61.4; 340/454
See application file for complete search history.

(56) References Cited

U.S. PATENT DOCUMENTS

| | | | | |
|---|---|---|---|---|
| 2,636,090 A | | 4/1953 | Branschofsky | 200/61.4 |
| 3,018,852 A | | 1/1962 | Stanton | |
| 3,592,295 A | | 7/1971 | Kenmal | 188/1.11 R |
| 4,231,012 A | | 10/1980 | Volan et al. | 540/454 |
| 4,353,325 A | * | 10/1982 | Argazzi | 118/683 |
| 4,658,936 A | * | 4/1987 | Moseley | 188/1.11 R |
| 5,186,284 A | * | 2/1993 | Lamela et al. | 188/71.8 |
| 5,228,541 A | | 7/1993 | Plude | 188/1.11 W |
| 5,992,577 A | | 11/1999 | Souetre | |
| 6,076,639 A | | 6/2000 | Dahlen et al. | 188/1.11 R |
| 6,659,233 B2 | * | 12/2003 | DeVlieg | 188/1.11 E |
| 6,895,991 B2 | * | 5/2005 | Woessner | 137/375 |
| 2006/0049566 A1 | * | 3/2006 | Bernstein | 269/43 |

FOREIGN PATENT DOCUMENTS

| | | |
|---|---|---|
| DE | 41 20 527 A1 | 1/1992 |
| EP | 0 833 071 A2 | 4/1998 |

* cited by examiner

*Primary Examiner*—Melody M Burch
(74) *Attorney, Agent, or Firm*—Birch, Stewart, Kolasch & Birch, LLP

(57) ABSTRACT

Apparatus including a carbon-carbon composite pressure plate (32, 42) having a friction surface (33, 43) on one side thereof, a non-friction surface (37, 47) on the opposite side thereof, and a body (39, 49) between said surfaces. A wear pin housing (36, 46) containing a wear pin retainer (35, 45) is located in the pressure plate body (39, 49), the wear pin housing opening to the non-friction surface (37, 47) but not opening to the friction surface (33, 43). A wear pin (31), preferably made of carbon-carbon composite material, is located in the wear pin retainer (35, 45). The wear pin retainer (35, 45), which may be made of carbon-carbon composite material, is held in place in the wear pin housing (36, 46) by the interaction of threading in the wear pin housing (36, 36) and threading in the wear pin retainer (35, 45) and optionally also by a carbonizable resin adhesive located between the wear pin housing threading and the wear pin retainer threading.

11 Claims, 4 Drawing Sheets

WEAR PIN ASSEMBLIES FOR CARBON-CARBON COMPOSITE BRAKE SYSTEMS

FIELD OF THE INVENTION

The present invention pertains to friction braking systems. The present invention provides an improved wear pin assembly that is particularly useful in connection with annular carbon-carbon composite stator discs employed in braking systems.

BACKGROUND OF THE INVENTION

Inasmuch as braking systems generally work by causing two components to rub against one another, it is normal for the components to gradually wear away. Therefore braking systems conventionally include wear indicators, so that the degree of wear can easily be monitored and so that when wear has reached a certain degree, the worn component can be replaced.

The prior art has developed many different approaches to wear indication in braking systems. For instance, U.S. Pat. No. 2,636,090 discloses a rod-and-piston brake shoe lining wear indicator. U.S. Pat. No. 3,952,295 discloses a brake shoe lining wear indicator that comprises a spring and trigger-release pin. U.S. Pat. No. 4,231,012 discloses a brake drum lining wear indicator comprising a plunger slidably mounted in a sleeve. U.S. Pat. No. 5,228,541, in its FIG. 4, shows a wear pin inserted in a hole in a brake pressure plate. The '541 patent claims a method of modifying a brake on an aircraft to accommodate a change in brake energy capacity. And U.S. Pat. No. 6,076,639 discloses a wear indicator for friction linings of brakes that comprises a displaceable measuring rod with one end in contact with the brake means and with the other end protruding outside the brake housing.

Wear pins are currently attached to brake pressure plates using a metal rivet which employs a through-hole in the pressure plate as an attachment point. The presence of the through-hole creates uneven wear patterns on the pressure plate and on the mating rotor. Also, the metal rivet is exposed to very high friction surface temperatures and is subject to rotation, both of which can lead to pull-out failure of the attachment. Wear pins made of steel are relatively heavy, and thus place a high radial load on the hole and/or retainer system used to position them.

In braking system parlance, a pressure plate is an annular carbon-carbon composite stator disc that transmits a force from the hydraulic system to the brake stack via the pistons. The brake stack, commonly referred to as a heatsink, comprises annular carbon-carbon discs of alternating stator and rotor elements. Pressure plates are often made of carbon-carbon composite material, while wear pins are typically made of steel. Conventionally, a wear pin is attached to a pressure plate on the non-friction back surface of the brake pressure plate and protrudes through a hole in the piston housing. Wear pin protrusion serves as a gauge of remaining wearable thickness of the brake stack during use.

FIGS. 1 and 2 of the present application illustrate conventional wear pin retainer designs. Both FIG. 1 and FIG. 2 are cross-sectional side views through a braking system pressure plate at a plane that includes the wear pin.

In FIG. 1, reference numeral 11 designates the wear pin. Wear pin 11 is held in place in wear pin housing 16 in pressure plate 12 by retaining clip 15. Wear pin 11 passes through piston housing 14. Pressure plate 12 has a friction surface 13 on the side thereof away from piston housing 14. Thus the wear pin retainer design shown in FIG. 1 uses only the wear pin and a retaining pin, with the wear pin mounted through the pressure plate.

In FIG. 2, reference numeral 21 designates the wear pin. Wear pin 21 is held in place in wear pin housing 26 in pressure plate 22 by steel cup 29. Steel cup 29 is attached to pressure plate 22 by rivet 27. Steel cup 29 has holes 28 for retaining clips (not shown). Wear pin 21 passes through piston housing 24. Pressure plate 22 has a friction surface 23 on the side thereof away from piston housing 24. As can be seen, then, the wear pin retainer design illustrated in FIG. 2 uses a steel cup which is riveted to the pressure plate. The wear pin is retained in the cup by means of retaining clips.

It should be noted that both of the conventional wear pin retainer designs require an opening on the friction surface of the pressure plate. This is undesirable for a variety of reasons, inasmuch at it may cause problems with respect to friction, wear, strength, and oxidation. Also, conventional designs are sometimes subject to loss of wear pins due to pin pull through.

SUMMARY OF THE INVENTION

One embodiment of this invention is a device comprising a carbon-carbon composite pressure plate having a friction surface on one side thereof, a non-friction surface on the opposite side thereof, and a body between said surfaces. In accordance with the present invention, a wear pin housing containing a wear pin retainer is located in said pressure plate body, said wear pin housing being open to said non-friction surface but not open to said friction surface. In other words, the present invention eliminates the necessity for a hole through the pressure plate body.

The wear pin retainer in the present invention is most preferably made of carbon-carbon composite material. The wear pin retainer may be held in place in the wear pin housing by the interaction of threading in the wear pin housing and threading in the wear pin retainer. Optionally, adhesive material may be located between the wear pin housing threading and the wear pin retainer threading to increase the structural integrity of the retainer/housing joint.

Another embodiment of this invention is an apparatus that includes the device as described and a wear pin located in the wear pin retainer portion of the device. In accordance with the invention, the wear pin may, in a preferred embodiment, be made of carbon-carbon composite material.

BRIEF DESCRIPTION OF THE DRAWINGS

The present invention will be more fully understood from the detailed description given hereinafter and from the accompanying drawings. The drawings are not to scale, and are presented for illustrative purposes only. Thus the drawings are not intended to limit the present invention.

DETAILED DESCRIPTION OF THE INVENTION

The design of the present invention incorporates a carbon-carbon retainer, preferably threaded, which is located in the back (that is, non-friction side) of the pressure plate. Threads may be coated with a carbonizable adhesive resin (e.g., a phenolic or epoxy novolac resin) prior to installation and then cured using a hot air gun. The through-hole is eliminated. A threaded connection is less likely to rotate. This approach is simple in terms of its constituent parts. This approach reduces problems with respect to friction, wear, strength, and oxidation caused by the through-hole. Making the wear pin of a carbon-carbon composite is another benefit provided by this invention. A preferred carbon-carbon composite wear pin is made from a pultruded carbon fiber/phenolic resin rod, where the carbon fibers are oriented in the linear direction of the pin. Alternatively, the carbon-carbon composite wear pin of this invention may be machined from blocks of carbon-carbon composite material.

Figure 1:
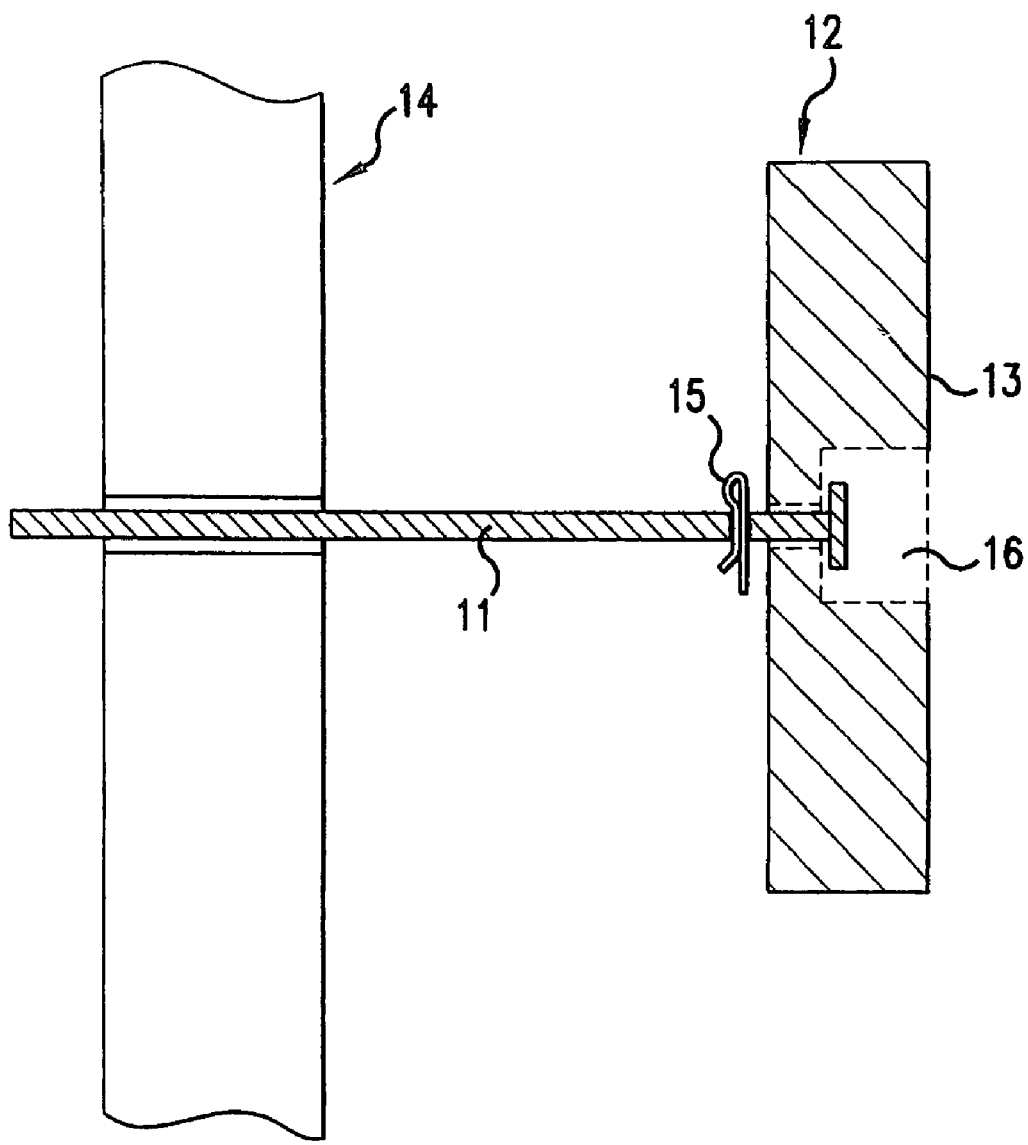
FIG. 1 is a cross-sectional side view of a conventional braking system pressure plate wear pin configuration.
Figure 2:
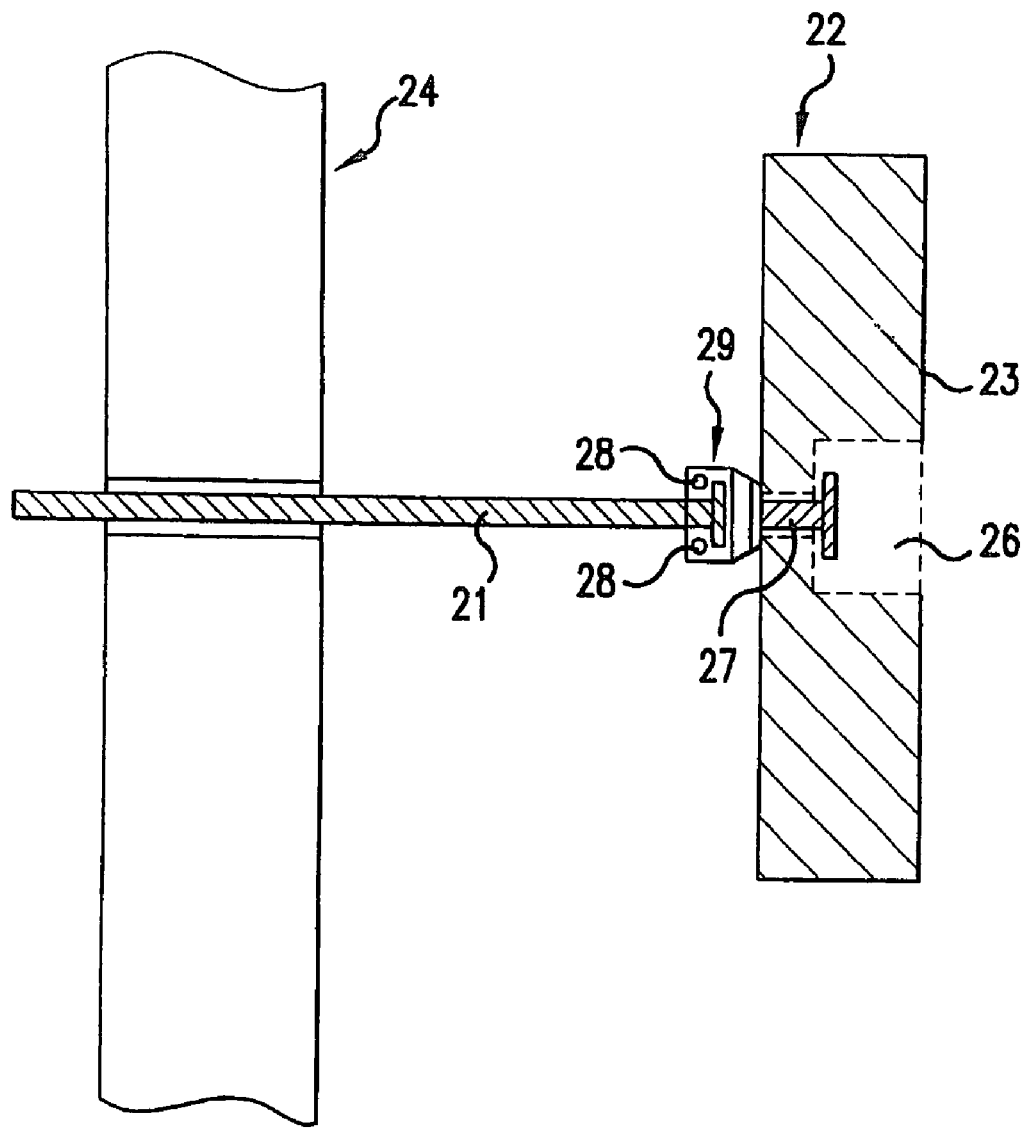
FIG. 2 is a cross-sectional side view of a different conventional braking system pressure plate wear pin configuration.
Figure 3:
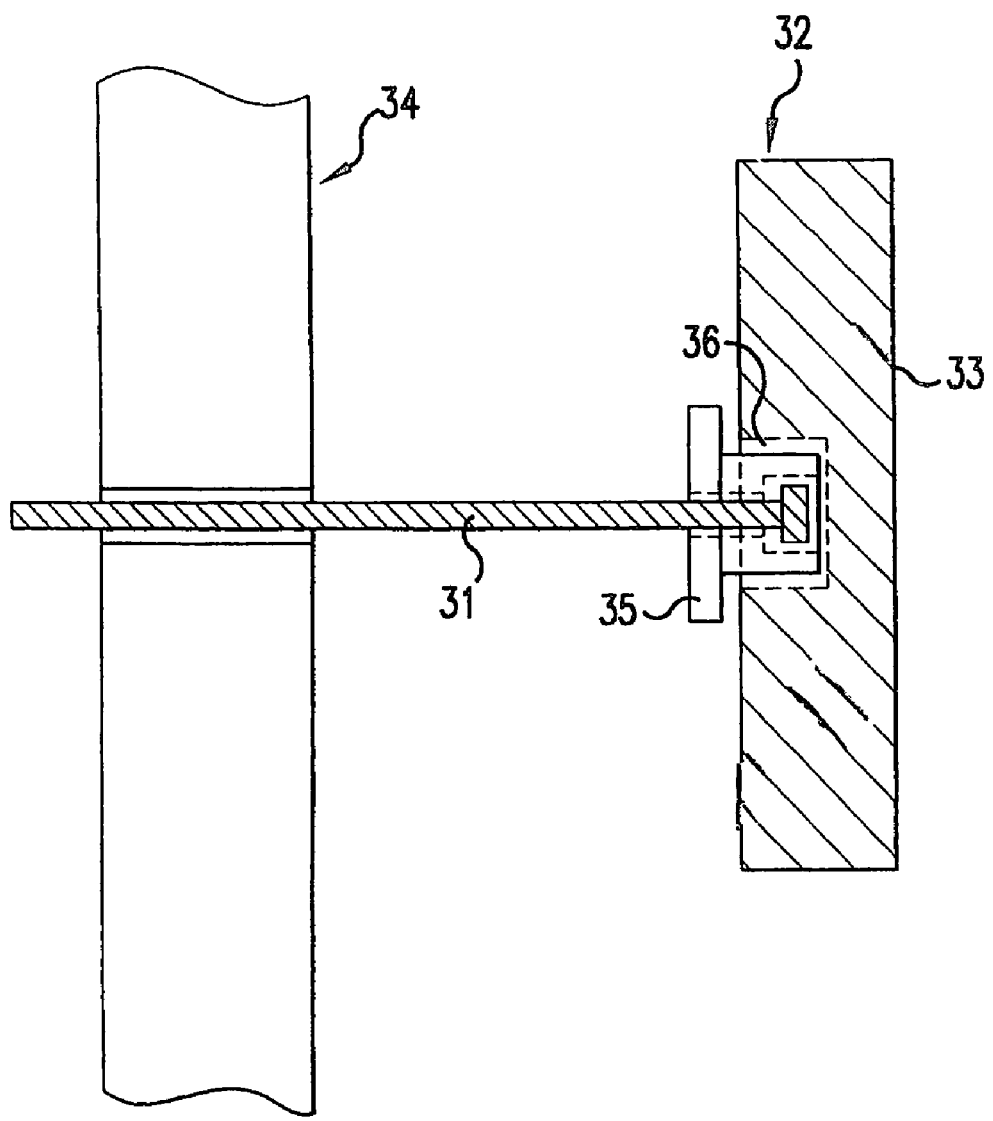
FIG. 3 is a cross-sectional side view of a braking system pressure plate wear pin configuration in accordance with the present invention.
Figure 4:
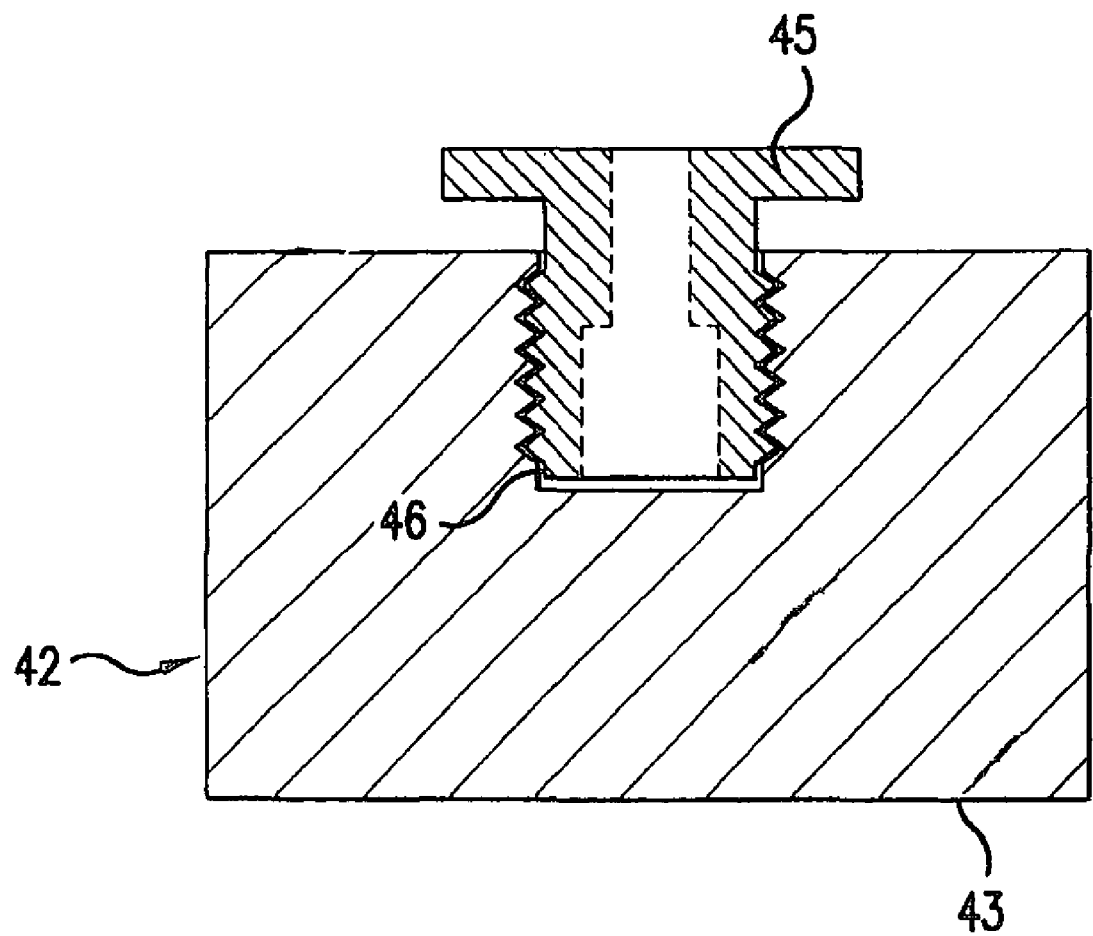
FIG. 4 is a cross-sectional side view of a braking system pressure plate wear pin housing and retainer configuration in accordance with the present invention.

The present invention provides a wear pin retainer design which does not require a through-hole in the pressure plate. FIG. 3 is a cross-sectional side view through a braking system pressure plate at a plane that includes the wear pin. In FIG. 3, reference numeral 31 designates the wear pin. Wear pin 31 is held in place in wear pin housing 36 in pressure plate 32 by embedded retainer 35. Wear pin 31 passes through piston housing 34. Pressure plate 32 has a friction surface 33 on the side thereof away from piston housing 34. FIG. 4 is a cross-sectional side view through a braking system pressure plate at a plane that includes a wear pin housing. In FIG. 4, embedded retainer 45 is located in wear pin housing 46 in pressure plate 42. Pressure plate 42 has a friction surface 43 on the side thereof away from the opening of wear pin housing 46. The present invention avoids the necessity of using retaining pins or rivets in the wear pin retainer assembly.

In accordance with the present invention, embedded wear pin retainer 35 may be made of steel, inconel, or graphite. Most preferably, however, embedded retainer 35 is made of carbon-carbon composite, so that it matches the coefficient of thermal expansion of the carbon-carbon composite pressure plate. Likewise, wear pin 31 may be made of steel. Most preferably, however, wear pin 31 is made of carbon-carbon composite, which imparts less overall weight to the braking system.

The embedded retainer in this invention may be held in place by a carbonizable adhesive, such as a phenolic resin adhesive system or an epoxy novolac resin adhesive system. The adhesive would be located in the space between the embedded retainer and the wear pin housing. More preferably, however, the wear pin housing and the embedded retainer are threaded. The embedded retainer is then screwed into the wear pin housing in the pressure plate, e.g. by means of a torque wrench. In a most preferred embodiment of this invention, adhesive is used in addition to threading to provide maximum security in the joint between the embedded retainer and the pressure plate.

What is claimed is:

1. A device comprising a carbon-carbon composite pressure plate having a friction surface on one side thereof, a non-friction surface on the opposite side thereof, and a body between said surfaces, wherein a wear pin housing containing a wear pin retainer is located in said pressure plate body, said wear pin housing opening to said non-friction surface but not comprising a hole through the pressure plate body and not opening to said friction surface.

2. The device of claim 1, wherein said wear pin retainer is made of carbon-carbon composite material.

3. The device of claim 1, wherein said wear pin retainer is held in place in said wear pin housing by the interaction of threading in the wear pin housing and threading in the wear pin retainer.

4. The device of claim 3, wherein said wear pin retainer is held in place in said wear pin housing by the interaction of the threading in the wear pin housing and the threading in the wear pin retainer and by adhesive material located between the wear pin housing threading and the wear pin retainer threading.

5. The device of claim 4, wherein a carbon-carbon composite wear pin retainer is held in place in said wear pin housing by the interaction of the threading in the wear pin housing and the threading in the wear pin retainer and by a carbonizable adhesive resin located between the wear pin housing threading and the wear pin retainer threading.

6. The device of claim 5, wherein the carbonizable adhesive resin is a phenolic resin or an epoxy novolac resin.

7. An apparatus comprising a carbon-carbon composite pressure plate having a friction surface on one side thereof, a non-friction surface on the opposite side thereof, and a body between said surfaces, wherein a wear pin housing containing a wear pin retainer is located in said pressure plate body, said wear pin housing opening to said non-friction surface but not opening to said friction surface, and wherein a wear pin is located in said wear pin retainer.

8. The apparatus of claim 7, wherein said wear pin retainer includes a carbon-carbon composite wear pin retainer held in place in said wear pin housing by the interaction of threading in the wear pin housing and threading in the wear pin retainer and by a phenolic or epoxy novolac resin adhesive located between the wear pin housing threading and the wear pin retainer threading.

9. The apparatus of claim 7, wherein said wear pin is made of carbon-carbon composite material.

10. The apparatus of claim 8, wherein said carbon-carbon composite wear pin is machined from a block of carbon-carbon composite material or is made of pultruded carbon fiber/phenolic resin in which the carbon fibers are oriented in the linear direction of the pin.

11. The apparatus of claim 10, wherein said carbon-carbon composite wear pin is made of pultruded carbon fiber/phenolic resin in which the carbon fibers are oriented in the linear direction of the pin.

* * * * *